United States Patent [19]

Zabler et al.

[11] Patent Number: 5,559,309
[45] Date of Patent: Sep. 24, 1996

[54] ACCELERATION SWITCH AND METHOD OF FABRICATION

[75] Inventors: Erich Zabler, Stutensee; Werner Uhler, Bruchsal; Andreas Baumann, Ettlingen; Joachim Eicher, Dortmund; Ralf-Peter Peters, Bergisch Gladbach, all of Germany

[73] Assignee: Robert Bosch GmbH, Stuttgart, Germany

[21] Appl. No.: 232,178

[22] PCT Filed: Aug. 7, 1993

[86] PCT No.: PCT/DE93/00708

§ 371 Date: Apr. 29, 1994

§ 102(e) Date: Apr. 29, 1994

[87] PCT Pub. No.: WO94/06144

PCT Pub. Date: Mar. 17, 1994

[30] Foreign Application Priority Data

Sep. 1, 1992 [DE] Germany .......................... 42 29 068.6

[51] Int. Cl.[6] .................................................. H01H 35/14
[52] U.S. Cl. ....................................................... 200/61.45 R
[58] Field of Search ................... 200/61.45 R–61.45 M

[56] References Cited

U.S. PATENT DOCUMENTS

| | | | |
|---|---|---|---|
| 2,930,863 | 3/1960 | Pasieka | 200/61.53 |
| 3,097,272 | 5/1962 | Hautly | 200/61.49 |
| 4,929,805 | 5/1990 | Otsubo | 200/61.45 R |
| 4,973,804 | 11/1990 | Cook et al. | 200/61.48 |
| 5,177,331 | 1/1993 | Rich et al. | 200/61.45 R |

FOREIGN PATENT DOCUMENTS

| | | | |
|---|---|---|---|
| 2715391 | 10/1978 | Germany | H01H 35/14 |
| 4126107 | 2/1993 | Germany | G01P 15/02 |
| WO88/08613 | 11/1988 | WIPO | H01H 35/14 |

OTHER PUBLICATIONS

Long–Sheng Fan et al., Integrated Movable Micromechanical Structures for Sensors and Actuators, IEEE Transactions on Electron Devices, vol. 35, No. 6, Jun. 1988, pp. 724–730.
J. Mohr, et al., Movable Structures Manufactured by the Liga Process as Basic Elements for Microsystems, Micro System Technologies 90, pp. 529–537.

*Primary Examiner*—Brian W. Brown
*Assistant Examiner*—Michael A. Friedhofer
*Attorney, Agent, or Firm*—Kenyon & Kenyon

[57] ABSTRACT

An acceleration switch has a seismic mass, which is suspended by springs (1) on a bearing block (7). The springs are designed as curved bending springs. If an acceleration acts on this sensor, then the seismic mass is noticeably deflected out of its neutral position when a critical acceleration is exceeded. By means of a lever (17), the seismic mass pulls a contact bar (21) toward a contact block (4), so that a current path is closed between the two parts of the contact block (4).

18 Claims, 5 Drawing Sheets

ACCELERATION SWITCH AND METHOD OF FABRICATION

BACKGROUND OF THE INVENTION

1. Prior Art

German Patent Application 41 26 107 discusses an acceleration switch, which does not return again to the original position until an acceleration occurs opposite the deflection direction. The German A1 37 37 142 describes a method for manufacturing the switch out of metal with the application of a polymer sacrificial layer. In *Microsystems Technologies 90, International Conference on Microelectro, Opto, Mechanical Systems and Components*, Berlin, Sep. 10–13, 1990, Springer Publishing House, pp. 529–537, Mohr et al describes the manufacturing of movable structures using the Liga method with the application of a metallic sacrificial layer. Fan et al., *IEEE Trans. Electron Dev.*, vol. 35, pp. 724–730, 1988 describes producing suitable structures for an acceleration switch out of silicon.

2. Summary of the Invention

The object of the present invention is to create an acceleration switch, which has a short reaction time and has a defined switching threshold, and which satisfies stringent safety requirements. This switch should be suited for use in safety devices in motor vehicles.

In accordance with the present invention, the switch opens again by itself when an acceleration threshold is not met in the operative direction.

Since the opening of the switch follows purely on the basis of the mechanical design, no additional control elements are needed which could increase costs or adversely affect safety.

The switching operation is released without being afflicted by friction, and thus by wear. The switching effect according to the invention produces a defined switching threshold and contact force, such that a contact closure characterized by an indefinite transition region between the open and closed circuit state is substantially suppressed. Furthermore, the switch constitutes a simple mechanical system, which is especially rugged and switches quite rapidly due to its small geometric dimensions. The purely mechanical operational principle of the acceleration switch renders it insensitive to electromagnetic disturbances, which can occur, for example in motor vehicles. The switching properties, such as switching threshold, contact force, contact travel and switching time, can be adjusted within broad ranges by the shaping of the springs. The method according to the present invention has the advantage that the acceleration switches are able to be manufactured with a high level of precision. Since the method according to the present invention allows a plurality of acceleration switches to be manufactured concurrently, the manufacturing costs are low.

In accordance with a second embodiment of the present invention, springs are designed quite simply as bending bars, the desired non-linear characteristics being achieved, for example, by a curvature of the springs. By properly dimensioning the springs, the switching threshold and the contact force of the sensor are able to be specified within broad limits by the design. Since the manufacturing costs per switch depend upon the surface area that is consumed, space can be economized and, thus, manufacturing costs can be reduced by arranging the springs in recesses of the seismic mass. When the switch is closed, in accordance with a third embodiment of the present invention, the current flows from the bearing block via the spring and the seismic mass to the contact block. A switch is formed by dividing the contact block, in which case the current can flow from one part of the contact block via the seismic mass to the other part of the contact block. In this refinement of the acceleration switch, the maximum permissible current is not restricted by the geometric dimensions of the springs. By dividing up the seismic mass into a heavy member and a contact bar, one is able to improve the contact closing between the seismic mass and the contact block. The flexible suspension mount of the contact bar ensures that the contact bar contacts both parts of the contact block with nearly the same force. The contact force can be increased by using a lever between the heavy member and the contact bar. In this manner, given a closed acceleration switch, the electrical contact resistance can be reduced to the extent that a large current is able to flow. Thus, the acceleration switch can be used for large-capacity switching, as required, for example, by active passenger-safety systems in motor vehicles. Furthermore, as a result of the elasticity of the lever system, an especially bounce-free switching of the switch is achieved. To use as little surface as possible when the lever proportions are large, it is often beneficial to design the lever as a multi-stage lever. When the lever is likewise suspended on a spring, the contact force is optimized through proper selection of the ratio, given a specified positioning travel of the lever. The contact resistance of the switch is reduced by means of a rare metal coating and knobs. Silicon and metals are particularly suited as materials for manufacturing the switches.

As a result of the method according to the present invention and the design entailing a considerable structure height compared to the spring thickness, a large selectivity is achieved with respect to the direction of the acceleration. It is thus rendered possible for large currents to be switched on a small space.

The bearing block and the contact block are able to be affixed quite simply to an insulating substrate through bonding.

DETAILED DESCRIPTION OF THE INVENTION

Figure 1:
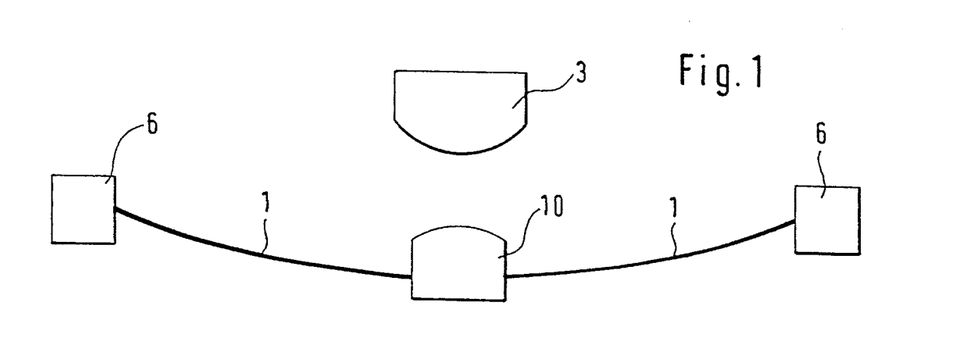
FIG. 1 depicts an opened acceleration switch in a top view.
Figure 2:
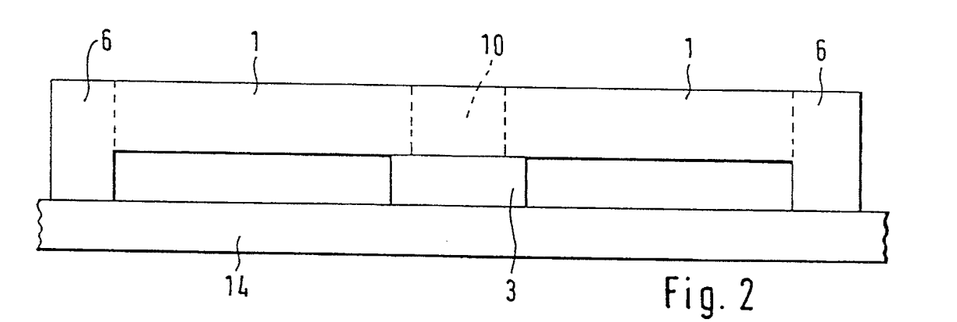
FIG. 2 shows the acceleration switch according to FIG. 1 in a side view.
Figure 3:
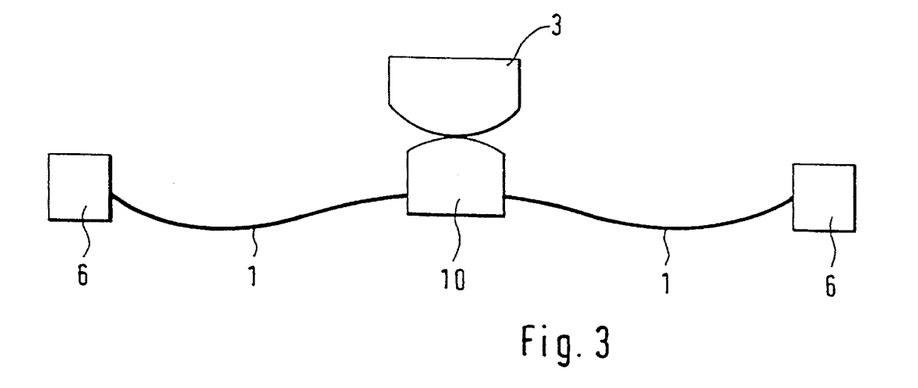
FIG. 3 shows the acceleration switch according to FIG. 1 and FIG. 2 in a closed state.

FIG. 1 shows a top view and FIG. 2 a side view of an acceleration switch according to the present invention including a contact block 3, two bearing blocks 6, a seismic mass 10 and two springs 1. The contact block 3 and the bearing blocks 6 are anchored to an insulating substrate 14. The springs 1 and the seismic mass 10 are suspended on the bearing blocks 6, so that they are not hindered in their mobility by friction with the insulating substrate 14. As a result, it is possible for the seismic mass 10 to be deflected out of its neutral position when there is an acceleration in the direction of the contact block 3, so that it makes contact with the contact block 3. This is illustrated in FIG. 3. The contacting of the contact block 3 and the seismic mass 10 causes a current path to be formed, so that a current can flow from the bearing blocks 6 via the springs 1 and the seismic mass 10 to the contact block 3. The supply leads (not shown here) leading to the bearing blocks 6 or rather to the contact block 3 permit the structure shown here to be used as an acceleration switch.

Ceramic materials, such as aluminum oxide, or silicon wafers having an appropriate insulation can be used as materials for the insulating substrate 14. Galvanically separable metals, such as copper or nickel, come under consideration as materials for the contact block 3, the bearing blocks 6, the springs 1, and the seismic mass 10. However, one can also conceive of semiconductive materials, such as silicon or gallium arsenide, which can be made conductive when properly doped. In connection with applied semiconducting layers, insulating materials, such as quartz, are also suited for manufacturing the acceleration switches. To keep the electrical resistance between the contact block 3 and the seismic mass 10 as low as possible, a thin layer of a rare metal, such as gold, can also be provided on the surface.

Methods for manufacturing such structures are described in the documents cited at the outset.

Figure 4:
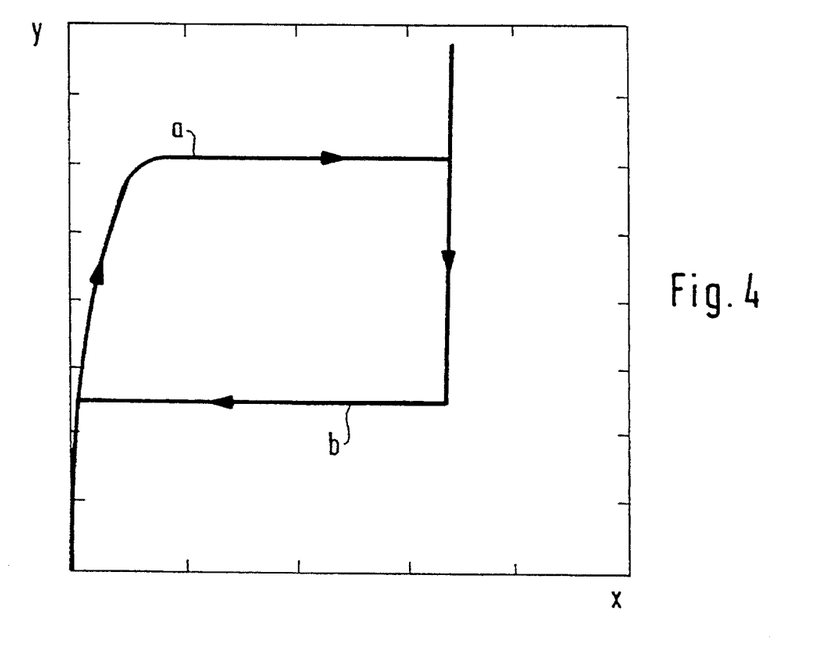
FIG. 4 shows a path-acceleration characteristic curve of the acceleration switch.

The switching performance of the sensor is described in FIG. 4 on the basis of a diagram. The deflection is plotted on the x-axis, the acceleration on the y-axis. Starting out from the original position shown in FIG. 1, the seismic mass 10 is deflected with rising acceleration as shown in curve a. Up to a critical acceleration, the deflection is only minimal, but then it jumps abruptly to a higher value. A further increase in the acceleration still only results in a negligible deflection, which predominantly consists in an elastic deformation of the seismic mass 10 or rather of the contact block 3. Starting out from the deflection position according to FIG. 3, the seismic mass 3 initially remains in the deflection position as shown in FIG. 3, given an abating acceleration. Not until the acceleration has clearly become less than the critical acceleration, at which the seismic mass 10 jumps out of its original position into the deflection position, does the seismic mass return from the deflection position to the original position, as represented by curve b in FIG. 4.

Figure 5:
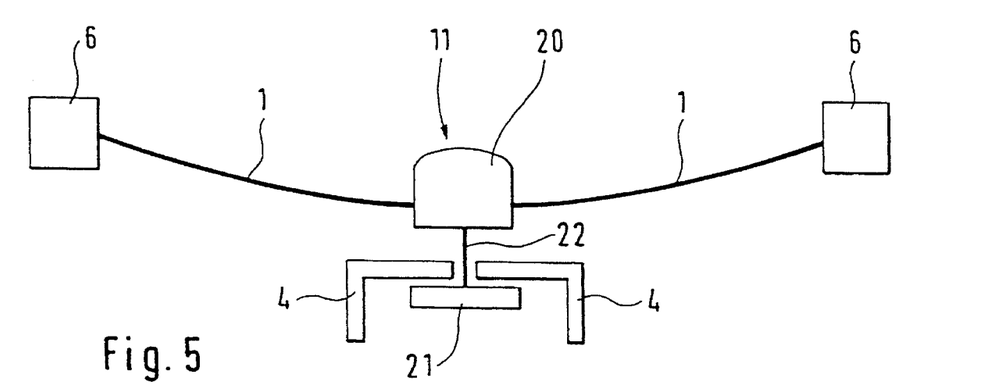
FIG. 5 shows an exemplified embodiment of a contact block that is divided in two.

Another refinement of the acceleration switch comprising bearing blocks 6, springs 1, a seismic mass 11 and a contact block 4 are shown in FIG. 5. The seismic mass 11 is developed as a heavy member 20 having a contact bar 21, and is connected to the contact bar 21 by a connecting spring 22. The contact block 4 consists of two halves. In the case of an acceleration, the seismic mass is displaced to such an extent that the contact bar 21 is pulled toward the two halves of the contact block 4. The connection spring 22 ensures that the contact bar 21 is pressed with approximately the same contact force against the two halves of the contact block 4, in spite of possible manufacturing errors. Thus, in the closed state, a current path is created, which allows current to flow from the one half of the contact block 4 via the contact bar 21 to the other half of the contact block 4. Therefore, the contacting of the two halves of the contact block 4 allows the described structure to be used as an acceleration switch. Through use of the contact bar 21, a larger cross-section is able to be achieved over the entire current path. The possibly very small cross-section of torsion springs is no longer a consideration at all.

Figure 6:
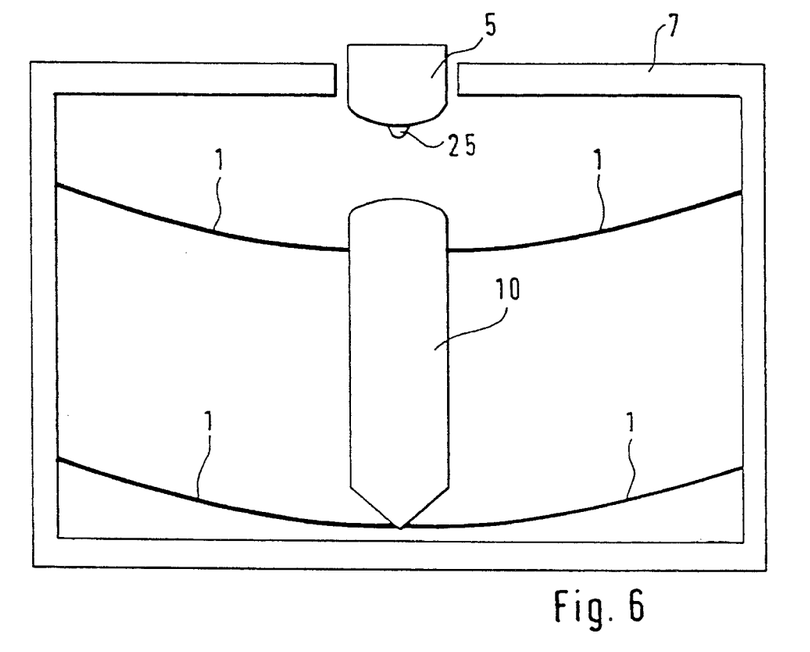
FIG. 6 shows the manufacturing using fusible links.
Figure 7:
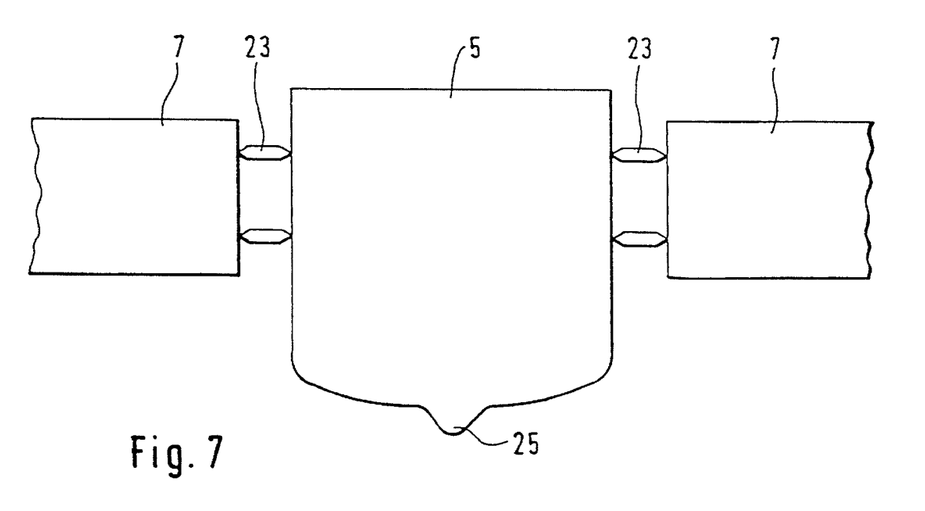
FIG. 7 shows a detail of FIG. 6.

Another embodiment of the acceleration switch according to the present invention that is quite simple to manufacture is shown in FIG. 6 and FIG. 7. The seismic mass 10 is suspended by four torsion springs 1 on a bearing block 7 shaped as a frame. The application of four torsion springs reduces the torsional sensitivity of the individual torsion springs 1. A torsion of the torsion springs is associated with an altered sensitivity of the acceleration switch to accelerations and should, therefore, be substantially suppressed. The contact block 5 is arranged opposite the seismic mass 10. Here, the contact block 5 has a knob 25. Because of the knob 25, the contact closing between the contact block 5 and the seismic mass 10 follows as a linear contact and not as a surface contact. Experience has shown that the contact properties of a linear contact, especially as pertains to contact resistance and ageing, are preferable to a surface contact. FIG. 7 shows the immediate surroundings of the contact block 5 during one intermediate manufacturing step. In this manufacturing stage, the contact block 5 is still connected by fusible links 23 to the bearing block 7. At this point, when an electric voltage is applied between the contact block 5 and the bearing block 7, the entire current flows across the fusible links 23, which heat up so intensely that they melt, because of their small cross-section. In this manner, an electrical isolation is achieved between the contact block 5 and the bearing block 7. Thus, the manufacturing method using fusible links comprises the following steps. First, the structure shown in FIG. 6 is produced, the contact block 5 still being connected in this case to the bearing block 7 via fusible links 23. The contact block 5 and the bearing block 7 are then anchored to an insulating substrate, so that the seismic mass 10 and the springs 1 are not hindered in their movement by friction. This can be achieved, for example, by applying a thick adhesive layer to the bottom side of the contact block 5 and the bearing block 7. After that, the contact block 5 and the bearing block 7 are isolated from one another in that the fusible links 23 are burned through. By properly selecting the adhesive layer and the insulating substrate, the thermally produced strains experienced among the individual parts of the switch and with the substrate can be reduced.

Figure 8:
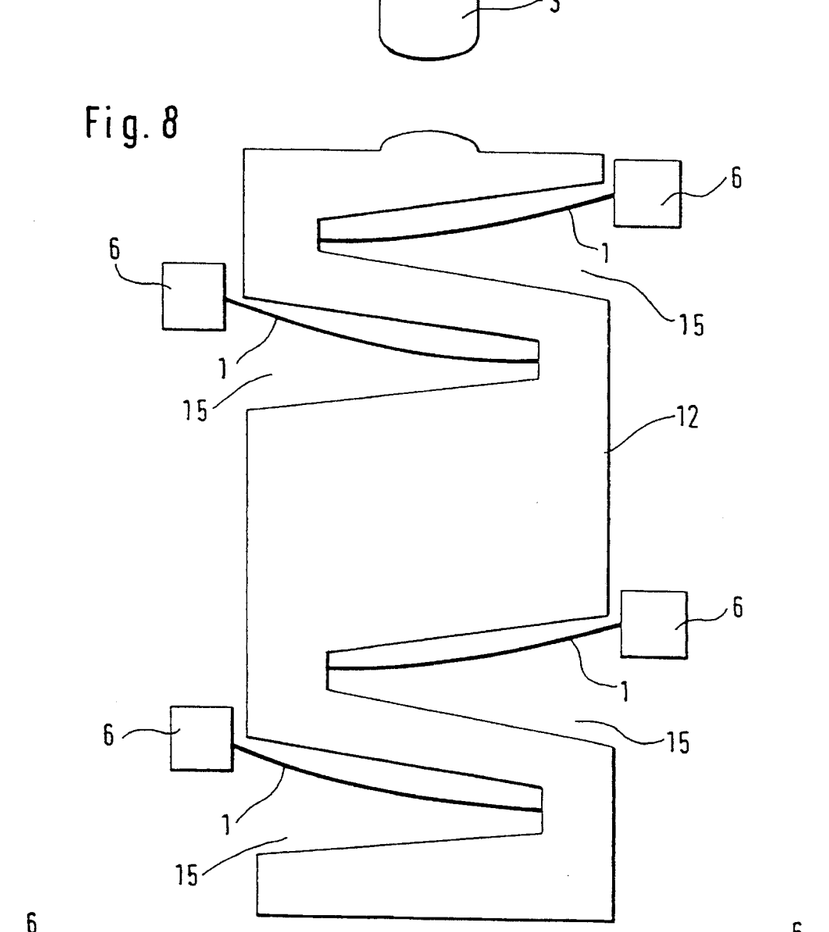
FIG. 8 shows the seismic mass provided with recesses.

Another embodiment of the acceleration switch is shown in FIG. 8, which comprises a seismic mass 12, bearing blocks 6, springs 1, and a contact block 3 arranged opposite the seismic mass 12. Introduced into the seismic mass 12, are recesses 15, in which springs 1 are situated. By arranging the springs 1 in recesses 15 of the seismic mass 12 in this manner, one reduces the space required to simultaneously manufacture a plurality of acceleration switches. The reason for this is that one can only ensure that a reasonable outlay is entailed in dividing up the substrate, on which the acceleration switches are produced, by applying linear steps. In the case of the compact form of the acceleration switches shown here, the acceleration switches can be produced closely together during manufacturing and, as a result, the number of acceleration switches manufactured per surface area can be increased. Furthermore, the torsional sensitivity of the torsion springs is reduced with this arrangement.

Figure 9:
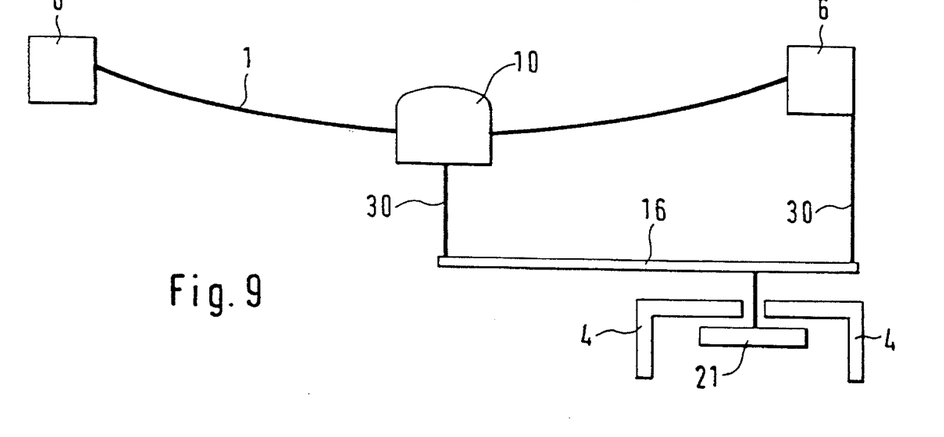
FIG. 9 shows an acceleration switch having a lever.

FIG. 9 illustrates another embodiment of the acceleration switch, which comprises bearing blocks 6, springs 1, a seismic mass 10, and a contact block 4 that is divided in two, and a contact bar 21. Still situated between the seismic mass 10 and the contact bar 21, however, is a lever suspended on retaining springs 30. When the seismic mass 10 is deflected out of its neutral position, then it deforms the retaining springs 30 to such an extent that the contact bar 21 is pulled toward the two parts of the contact block 4. Due to the mechanical advantage ratio of the lever, the thereby occurring contact force, i.e., the force with which the contact bar 21 is pulled toward the two parts of the contact block 4, is greater than when the seismic mass 10 pulls directly on the contact bar 21. An increase in the contact force is desirable, since the electrical contact resistance is reduced by means of a high contact force. In the refinement of the lever, however, a specific minimum positioning travel, i.e., the path that the contact bar 21 covers from the neutral position up to the contact closing, must also be considered. A positioning travel of more than 10 micrometers is desirable, for example. Given a specified positioning travel, the attainable contact force is smaller than the contact force that is to be expected on the basis of the simple lever ratios. The reason for this is that a portion of the force must be expended to deform the retaining springs. An optimum contact force is achieved when, given a completely deflected seismic mass 10 and a closed contact, the lever is designed so as to allow exactly half of the force being applied by the seismic mass 10 to the lever 16 to be expended to deform the retaining springs 30.

Figure 10:
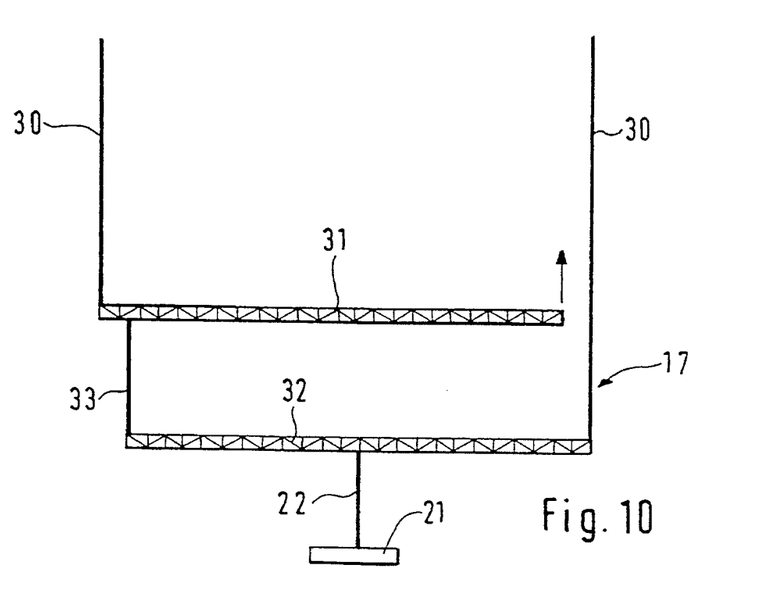
FIG. 10 shows a multi-stage lever.

Another embodiment of a lever in accordance with the present invention is shown as a multi-stage lever 17 in FIG. 10. The multi-stage lever 17 is designed here as a two-stage lever. This lever consists of a first partial lever 31, at whose end, the seismic mass pulls, as indicated by the arrow. Furthermore, the first partial lever 31 is suspended on a retaining spring 30. The force is carried over through a connection 33 to a second partial lever 32. The contact bar 21 is mounted by way of a connecting spring 22 on this second partial lever 32. Furthermore, the second partial lever 32 is suspended on a retaining spring 30. This multi-stage lever 17 functions in the same way as the lever shown in FIG. 9. However, compared to the lever depicted in FIG. 9, the multi-stage lever 17 makes it possible to realize very large mechanical lever ratios with a simultaneously very compact structure. Thus, by using multi-stage levers, one can improve upon the utilization of the surface area in manufacturing, similarly to the application of springs 1 situated in recesses 15 of the seismic mass. To keep the inertia of the two partial levers 31, 32 to a minimum, they are designed as bar-type assemblies.

Figure 11:
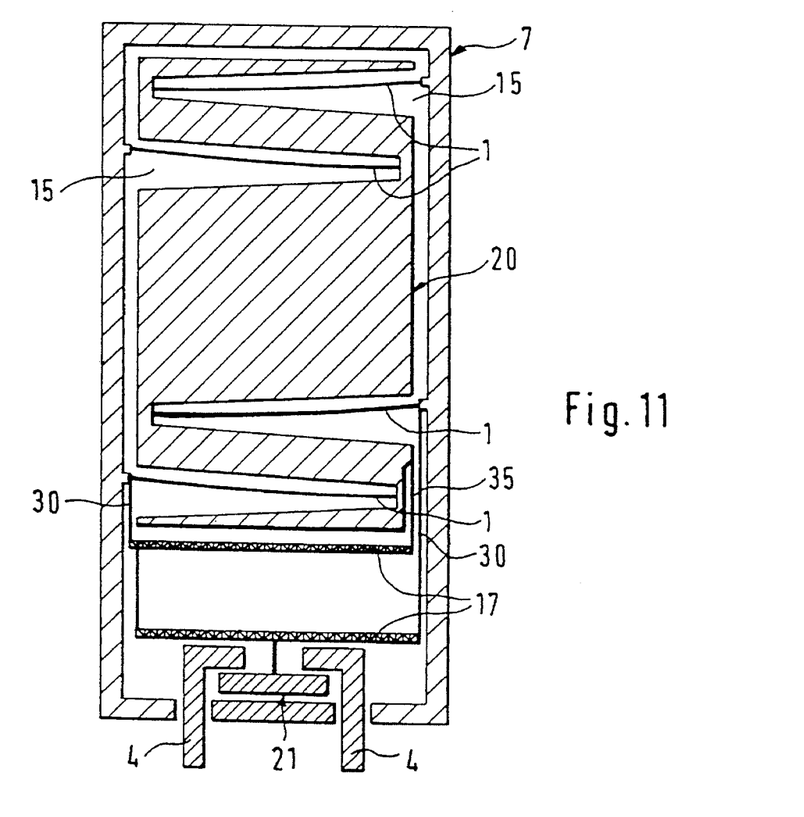
FIG. 11 shows an exemplified embodiment comprising a multi-stage lever.

FIG. 11 depicts an acceleration switch according to the present invention which combines a series of advantages. The seismic mass 13 has recesses 15, in which the torsion springs 1 are situated. The bearing block 7 is designed as a frame, the contact block 4 divided in two being arranged so as to allow the sensor to be manufactured using fusible links. The contact bar 21 is connected by way of a two-stage lever 17 to the seismic mass 13. The accelerative force of the seismic mass 13 is transferred by means of a force-introducing spring 35 to the two-stage lever 17. This lever is suspended by retaining springs 30 on the bearing block 7. The sensor shown here can be manufactured with little outlay for surface area. Since fusible links can be used, the manufacturing is especially simple, and the attainable contact force is high.

We claim:

1. An acceleration switch comprising:

at least one seismic mass;

at least one spring having a first end and a second end, the first end connected to the seismic mass;

at least one contact block, the at least one seismic mass disposed at a first distance from the at least one contact block, the at least one contact block and the at least one seismic mass including a conductive material;

at least one bearing block, the second end of the at least one spring connected to the at least one bearing block;

a one piece insulating substrate, the at least one contact block and the at least one bearing block secured to the insulating substrate, the at least one seismic mass and the at least one spring disposed at a second distance from the insulating substrate, the at least one bearing block, the at least one spring, and the at least one seismic mass each having a side which is substantially perpendicular to a plane of the insulating substrate, the at least one seismic mass moving in a direction parallel to the plane of the insulating substrate; and the at least one seismic mass residing in a first position when no acceleration is applied to the acceleration switch, the at least one seismic mass being displaced slightly from the first position when an acceleration smaller than a first specified acceleration is applied to the acceleration switch, the at least one seismic mass moving to a second position when an acceleration greater than the first specified acceleration is applied to the acceleration switch, the at least one seismic mass contacting the at least one contact block when the at least one seismic mass is in the second position, the at least one seismic mass being displaced from the second position to the first position when an acceleration smaller than a second specified acceleration is applied to the acceleration switch while the at least one seismic mass is in the second position, the second specified acceleration being smaller than the first specified acceleration.

2. The acceleration switch according to claim 1 wherein the at least one spring includes at least two bending bars, each of the at least two bending bars having a length which exceeds its width.

3. The acceleration switch according to claim 2, wherein each of the at least two bending bars is curved while the at least one seismic mass is in the first position.

4. The acceleration switch according to claim 3 wherein the seismic mass has at least one recess, the at least two bending bars extending into the at least one recess.

5. The acceleration switch according to claim 1 wherein a current path is formed from the at least one bearing block through the at least one spring and the at least one seismic mass into the contact block when the at least one seismic mass is in the second position.

6. The acceleration switch according to claim 1 wherein the contact block includes a first part and a second part, the first part being electrically isolated from the second part, the at least one seismic mass contacting both the first part and the second part when the at least one seismic mass is in the second position, a current path being formed from the first part through the at least one seismic mass to the second part when the at least one seismic mass is in the second position.

7. The acceleration switch according to claim 1 wherein the at least one seismic mass includes a heavy member and a contact bar, the heavy member being secured to the contact bar, the contact bar being pressed against the contact block when the at least one seismic mass is in the second position.

8. The acceleration switch according to claim 7 wherein the contact bar is elastically secured to the heavy member.

9. The acceleration switch according to claim 1 wherein the at least one seismic mass includes a heavy member, a contact bar, and a lever, the heavy member being secured to one side of the lever and the contact bar being secured to an opposite side of the lever.

10. The acceleration switch according to claim 1 wherein the at least one seismic mass includes a heavy member, a contact bar, and a plurality of levers connected in series to one another, the heavy member being secured to a first of the plurality of levers and the contact bar being secured to a last of the plurality of levers.

11. The acceleration sensor according to claim 9 wherein the lever is suspended on at least one retaining spring and wherein the ratio of the lever is selected such that a force exerted by the retaining spring is half of a force exerted by the heavy member on the lever while the at least one seismic mass is moving to the second position.

12. The acceleration switch according to claim 1 wherein the at least one contact block has a knob extending towards the at least one seismic mass.

13. The acceleration switch according to claim 1 wherein the at least one seismic mass has a knob extending towards the at least one contact block.

14. The acceleration switch according to claim 1 wherein the at least one contact block, the at least one bearing block, the at least one spring, and the at least one seismic mass include metal.

15. The acceleration switch according to claim 1 wherein the at least one contact block, the at least one bearing block, the at least one spring, and the at least one seismic mass include silicon.

16. The acceleration switch according to claim 1 wherein the at least one contact block is connected to the at least one bearing block via fusible links, the at least one contact block and the at least one bearing block further being connected to the insulating substrate, the fusible links being burned when a voltage is applied between the at least one contact block and the at least one bearing block during manufacture.

17. The acceleration switch according to claim 1 wherein the at least one bearing block and the at least one contact block are bonded to the insulating substrate.

18. The acceleration switch according to claim 1 wherein a first side of the at least one contact block faces a first side of the at least one seismic mass, the first side at least one contact block and the first side of the at least one seismic mass each having a coating of rare metal.

* * * * *

UNITED STATES PATENT AND TRADEMARK OFFICE
CERTIFICATE OF CORRECTION

PATENT NO. : 5,559,309

DATED : September 24, 1996

INVENTOR(S) : Erich Zabler et al.

It is certified that error appears in the above-indentified patent and that said Letters Patent is hereby corrected as shown below:

On the Title page, "[73] Assignee" should read:

--Robert Bosh GmbH

Federal Republic of Germany and microParts, Gesellschaft fur Mikrostrukturtechnik mbH Federal Republic of Germany--

Signed and Sealed this

Eighteenth Day of February, 1997

Attest:

BRUCE LEHMAN

*Attesting Officer*      *Commissioner of Patents and Trademarks*